Feb. 15, 1966  H. W. CHRISTENSON ET AL  3,234,786
HYDRAULIC TORQUE MEASURING DEVICE
Original Filed May 27, 1957

INVENTORS.
Howard W. Christenson,
BY William G. Livezey, &
William E. Schilke
A. M. Neiter
ATTORNEY

United States Patent Office 3,234,786
Patented Feb. 15, 1966

3,234,786
HYDRAULIC TORQUE MEASURING DEVICE
Howard W. Christenson and William G. Livezey, Indianapolis, and William E. Schilke, Brownsburg, Ind., assignors to General Motors Corporation, Detroit, Mich., a corporation of Delaware
Original application May 27, 1957, Ser. No. 661,781, now Patent No. 3,101,012, dated Aug. 20, 1963. Divided and this application Apr. 1, 1963, Ser. No. 269,509
7 Claims. (Cl. 73—136)

This invention relates to a transmission or drive train torque meter and is a division of application S.N. 661,-781, filed May 27, 1957, Patent No. 3,101,012.

The torque meter employs a planetary gear unit having an input and an output and a reaction element connected to a pressure regulating unit. In the preferred embodiment, the planetary gear unit has an input sun gear, an output carrier and a ring gear reaction member connected to the pressure regulating unit of the torque meter. This planetary gear unit also provides a reduction gear in the drive train. The torque meter pressure regulating unit consists of a double ended cylinder secured to a fixed support and a piston located in the cylinder and connected to the reaction member. The piston has a central bore in which a tube, connected to a supply passage, is located. Cooperating ports in the tube and cylinder regulate the pressure of the fluid supplied to each end of the cyilnder to a value sufficient to resist movement of the piston toward the end of the cylinder under the influence of the torque reaction force. The hydraulic unit thus provides a pressure proportional to torque. The higher of the pressure in the operating chambers is connected by a double acting check valve to a torque signal line.

An object of the invention is to provide a torque meter which regulates a fluid pressure to a value sufficient to resist movement of a movable wall moved by the torque reaction of the drive train to provide a signal pressure proportional to torque transmitted by the drive train.

Another object of the invention is to provide a double acting torque meter having a piston movable in a cylinder with the piston having a bore receiving a tube fixed in the cylinder and having cooperating valve ports to regulate the supply of fluid under a pressure from a source selectively to either of the ends of the cylinder in accordance with the direction of the reaction force on the piston and to regulate the pressure in the selected cylinder end in accordance with the torque reaction.

These and other objects of the invention will be more apparent from the following description and drawing of the preferred embodiment.

Figure 1:
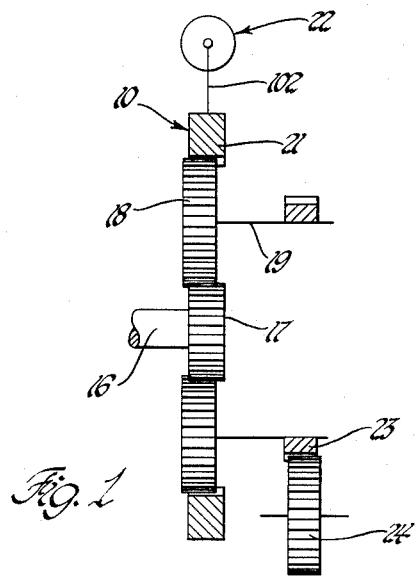
Figure 2:
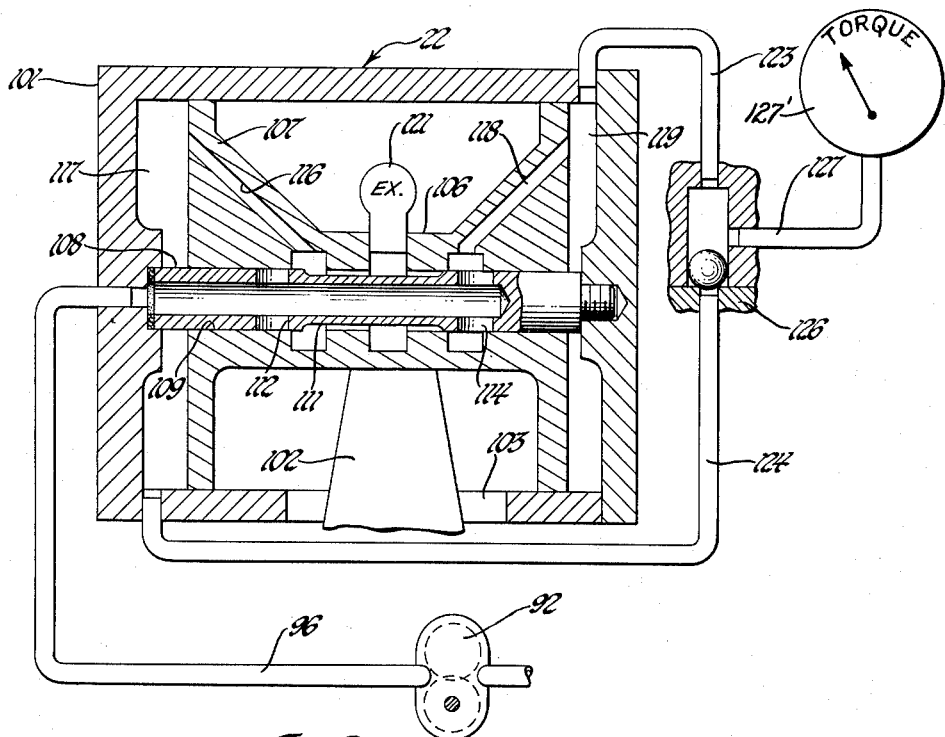

FIGURE 1 is a diagrammatic view of the torque meter.
FIGURE 2 is an enlarged diagrammatic view of the torque meter hydraulic unit.

The torque meter may be employed in a transmission, shown in the above Patent No. 3,101,012. The torque meter gear set 10 provides both a torque reaction and thus a measure of the torque transmitted by the gear set and a gear reduction. In this gear set the input shaft 16 drives the sun gear 17 which meshes with planetary pinions 18 mounted on the carrier 19 providing the output element of this gear set. The ring gear 21, or reaction element, meshes with the pinions and provides the reaction force proportional to the torque being transmitted by the gear unit. The ring gear is pivotally connected by the arm 102 to the piston 107 of the hydraulic torque meter unit 22. The output carrier 19 also drives an accessory gear 23 which through the pinion 24 drives the pump 92 to supply fluid from a sump, not shown, to a fluid supply line 96 which supplies fluid to the hydraulic torque meter unit 22.

The torque meter 22 has a cylinder 101 which is closed at both ends and mounted on the transmission housing so that it is stationary. The torque meter measures the reaction on the ring gear 21 which is proportional to the torque being transmitted by the transmission. The ring gear 21 has fixed thereon a radially extending arm 102 which extends through a slot 103 in cylinder 101 and may have a forked end connected in a conventional manner not shown, for example, by a pin and slot connection, to the central portion 106 of the double ended piston 107 to axially move the piston in the cylinder whenever the ring gear 21 moves. The cylinder 101 has an axial tube 108 fixed and sealed to the cylinder. The tube is connected to the torque meter supply line 96 and closed at the opposite end of tube 108 and fits within an axial bore 109 extending through piston 107 to provide a valve. The tube valve parts comprise, on the tube 108, a central groove 111 or portion of reduced external diameter and ports 112 and 114 spaced from opposite ends of the groove 111 and on the piston 107 supply ports and passages 116 and 118 extending from bore 109 to cylinder end 117 and 119 respectively and exhaust 121 at the center of bore 109. With the piston 107 in the central position, the port 112 is connected to a passage 116 communicating with one end 117 of the cylinder while the port 114 is connected by a passage 118 with the other end 119 of the cylinder 101 and these passages 116 and 118 are also connected by the groove 111 to exhaust 121 and slot 103 through which fluid is returned to the transmission sump.

When the forward torque reaction force on the gear 21 moves the arm 102, for example, to the right as shown in FIGURE 2, the piston 107 is moved to the right closing port 112 and the connection between the passage 118 and groove 111 to exhaust 121 so that the supply line 96 is connected through the tube 108, port 114, and passage 118 to the end 119 of the cylinder 101. This pressure will be proportionate to the torque reaction on the gear 21 since an excess pressure in the cylinder end 119 will move the piston back to open exhaust 121. Thus a pressure proportionate to the torque reaction gear 21 is supplied to line 123. The other cylinder end 117 is simultaneously connected by passage 116 and groove 111 to exhaust 121 so no pressure is supplied to line 124. Movement of the arm 102 in the opposite direction by reverse torque reaction on gear 21 similarly provides pressure in cylinder end 117 proportionate to the torque reaction which is supplied to line 124. Lines 123 and 124 each provide a signal proportional to torque in one direction and are connected through a double acting check valve 126 to the torque signal line 127 which supplies pressure proportional to the torque transmitted through the transmission during both forward and reverse drive. Torque signal line 127 may be connected to any suitable conventional pressure sensing means such as valve 186 of the applicants' Patent 3,101,012 or any pressure gauge 127' which will then register torque.

When there is no torque force on the arm 102, the piston 107 will be centered in the cylinder 101 connecting the supply line 96 through tube 108 and both ports 112 and 114 to both cylinder chambers 117 and 119 and the exhaust 121. Movement of the arm 102 by torque force in one direction will compress the fluid in one of the cylinder chambers and connect the other cylinder chamber to exhaust 121. The pressure of the fluid in the chamber under pressure will be regulated by the controlling regulator valve to provide a pressure sufficient to hold the valve in the neutral condition supplying fluid to the chamber and exhausting fluid to exhaust 121 through a restriction creating in the pressure chamber a pressure proportional to the force or torque reaction on lever 102.

The above described preferred embodiment of the invention may be modified within the terms of the appended claims.

We claim:

1. In a torque measuring device, a cylinder having opposed closed end portions, a piston in said cylinder having opposed faces, torque means moved in opposite directions by torque in opposite directions connected to said piston, a source of fluid under pressure, said cylinder and piston having cooperating valve means connecting said source to exhaust under no torque conditions, and providing a pressure proportional to the torque in one direction at one end portion of said cylinder and proportional to the torque in the other direction at the other end portion of said cylinder, and pressure sensing means connected to said opposed closed end portions of said cylinder to sense torque.

2. In a torque measuring device, a cylinder having opposed closed end portions, a piston in said cylinder having opposed faces, torque means moved in opposite directions by torque in opposite directions connected to said piston, a source of fluid under pressure, said cylinder and piston having cooperating regulating valve means connecting said source to exhaust under no torque conditions, and providing a pressure proportional to the torque in one direction at one end portion of said cylinder as the piston approaches the said one end of said cylinder and a pressure proportional to the torque in the other direction at the other end portion of said cylinder as the piston approaches said other end of said cylinder, and pressure sensing means connected to said opposed closed end portions of said cylinder to sense torque.

3. The invention defined in claim 2 and a bore in said piston, a tube connected to said source fixed to said cylinder, and located in said bore, and said regulating valve means having cooperating ports in said tube and bore.

4. The invention defined in claim 2 and said cylinder having a central opening in the side wall, said torque means having an arm extending through said opening and connected to said piston, and said regulating valve means having exhaust means communicating at all times with said opening.

5. The invention defined in claim 2 and said pressure sensing means including a first and a second passage connected respectively to said end portions, a third passage and valve means connecting the one of said first and second passages having the higher pressure to said third passage.

6. The invention defined in claim 2 and said torque means including a planetary gear unit having an input member, an output member and a reaction member connected to move an arm element connected to said piston.

7. In a force measuring device, a cylinder having opposed closed end portions, a piston in said cylinder having opposed faces, force means moved in opposite directions by force in opposite directions connected to said piston, a source of fluid under pressure, said cylinder and piston having cooperating regulating valve means connecting said source to exhaust under no force conditions, and providing a pressure proportional to the force in one direction at one end portion of said cylinder as the piston approaches the said one end of said cylinder and a pressure proportional to the force in the other direction at the other end portion of said cylinder as the piston approaches said other end of said cylinder, and pressure sensing means connected to said opposed closed end portions of said cylinder to sense force.

References Cited by the Examiner

UNITED STATES PATENTS

| 2,154,489 | 4/1939 | Buck | 73—136 X |
| 2,233,498 | 3/1941 | Taylor | 73—136 X |
| 2,444,363 | 6/1948 | Newcomb | 73—136 |
| 2,581,239 | 1/1952 | Clark et al. | 73—136 |
| 2,638,781 | 5/1953 | McDuffie et al. | 73—141 X |
| 2,783,645 | 3/1957 | Hornbostel | 73—136 |

RICHARD C. QUEISSER, *Primary Examiner.*